US010643637B2

(12) United States Patent
Boulanger et al.

(10) Patent No.: US 10,643,637 B2
(45) Date of Patent: May 5, 2020

(54) RETROACTIVE SOUND IDENTIFICATION SYSTEM

(71) Applicant: Harman International Industries, Incorporated, Stamford, CT (US)

(72) Inventors: Adam Boulanger, Palo Alto, CA (US); Joseph Verbeke, San Francisco, CA (US); Stefan Marti, Oakland, CA (US); Davide Di Censo, Sunnyvalle, CA (US); Sven Kratz, San Jose, CA (US)

(73) Assignee: Harman International Industries, Inc., Stamford, CT (US)

( * ) Notice: Subject to any disclaimer, the term of this patent is extended or adjusted under 35 U.S.C. 154(b) by 0 days.

(21) Appl. No.: 16/029,491

(22) Filed: Jul. 6, 2018

(65) Prior Publication Data
US 2020/0013427 A1 Jan. 9, 2020

(51) Int. Cl.
*G10L 25/51* (2013.01)
*G06F 16/683* (2019.01)
*G06F 16/638* (2019.01)
*G10L 15/08* (2006.01)
*G10L 15/22* (2006.01)
*G06F 3/16* (2006.01)

(52) U.S. Cl.
CPC .............. *G10L 25/51* (2013.01); *G06F 3/165* (2013.01); *G06F 16/638* (2019.01); *G06F 16/683* (2019.01); *G10L 15/08* (2013.01); *G10L 15/22* (2013.01); *G10L 2015/088* (2013.01)

(58) Field of Classification Search
None
See application file for complete search history.

(56) References Cited

U.S. PATENT DOCUMENTS

| 9,196,242 | B1* | 11/2015 | Master | G10L 15/08 |
| 9,904,506 | B1* | 2/2018 | Jehan | G06F 3/16 |
| 2007/0282860 | A1 | 12/2007 | Athineos et al. | |
| 2010/0211693 | A1 | 8/2010 | Master et al. | |
| 2010/0318586 | A1* | 12/2010 | Wessling | G06F 17/30743 707/736 |
| 2012/0143610 | A1* | 6/2012 | Wang | G10L 15/10 704/256 |

(Continued)

FOREIGN PATENT DOCUMENTS

WO 2016/032985 A1 3/2016
WO 2016/168456 A1 10/2016

OTHER PUBLICATIONS

Extended European Search Report for application No. 19183436.5 dated Sep. 30, 2019.

*Primary Examiner* — Qin Zhu
(74) *Attorney, Agent, or Firm* — Artegis Law Group, LLP

(57) ABSTRACT

A method for identifying at least one characteristic of a sound-producing object includes storing, in a memory, audio data acquired from an auditory environment via at least one microphone; receiving an input indicating a user request to identify a characteristic of a sound-producing object included in the auditory environment; determining, via a processor and based on a portion of the audio data acquired from the auditory environment prior to the user request, the characteristic of the sound-producing object; and causing information corresponding to the characteristic of the sound-producing object to be output via at least one output device.

19 Claims, 6 Drawing Sheets

(56) References Cited

U.S. PATENT DOCUMENTS

| | | | |
|---|---|---|---|
| 2014/0010391 A1* | 1/2014 | Ek .......................... | G06F 3/011 |
| | | | 381/310 |
| 2014/0098228 A1* | 4/2014 | Plante ............. | H04N 21/23406 |
| | | | 348/148 |
| 2014/0129937 A1* | 5/2014 | Jarvinen ............... | G06F 3/0487 |
| | | | 715/716 |
| 2015/0039320 A1* | 2/2015 | Neuhauser ........... | G10L 19/018 |
| | | | 704/500 |
| 2016/0306758 A1* | 10/2016 | Lu .......................... | G06F 3/165 |
| 2017/0105080 A1* | 4/2017 | Das ........................ | H04R 29/00 |
| 2017/0195810 A1* | 7/2017 | Gonzales, Jr. ....... | G07C 5/0808 |
| 2017/0206898 A1* | 7/2017 | Bernard .............. | G10L 21/0232 |
| 2017/0256270 A1* | 9/2017 | Singaraju ................ | G10L 25/84 |
| 2018/0046864 A1* | 2/2018 | Flint .................. | G06K 9/00771 |
| 2018/0047394 A1* | 2/2018 | Tian ........................ | G10L 15/24 |
| 2018/0091909 A1* | 3/2018 | Lewis .................... | H04R 29/00 |
| 2019/0303797 A1* | 10/2019 | Javali ..................... | G09B 19/06 |

\* cited by examiner

RETROACTIVE SOUND IDENTIFICATION SYSTEM

BACKGROUND

Field of the Embodiments

Embodiments of the present disclosure relate generally to computer information systems, and, more specifically, to a retroactive sound identification system.

Description of the Related Art

The establishment of the Internet has made information on essentially any subject readily available to anyone with an Internet connection. Furthermore, the widespread use of smart phones, wearables, and other wireless devices provides many users an Internet connection at essentially all times. Freed from the necessity of a wired connection, users can now perform an Internet search by opening a web browser on a smartphone or electronic tablet whenever wireless service is available. In addition, the incorporation of intelligent personal assistants (IPAs) into wireless devices, such as Microsoft Cortana™, Apple Siri™, and Amazon Alexa™ enables users to initiate a search for information on a particular topic without looking at a display screen or manually entering search parameters. Instead, the user can retrieve information from the Internet verbally by speaking a question to the IPA.

In general, in order to perform an Internet search, a person performing the search must know at least some specific information about the subject of interest. In many cases, however, the person performing the search may be unable to sufficiently describe a particular subject of interest and/or may have difficulty articulating search parameters for the subject of interest. For example, when a person hears an unexpected, unusual, or unfamiliar sound, he or she may not be able to accurately describe the sound or formulate a search query in order to identify a source of the sound. If a user is unable to provide an accurate description or relevant search parameters, then an IPA and associated algorithms may be unable to provide a useful response to the user's request. Further, because some events are ephemeral, the user may not have the opportunity to identify the sound. Further, sound events are transient, meaning once they have occurred, they typically cannot be retrieved. As a result, the user may be unable to employ the vast information pool of the Internet to determine or otherwise examine the source or cause of the sound.

In light of the above, more effective techniques for identifying aspects of a sound event would be useful.

SUMMARY

The various embodiments set forth a method of identifying a source of a sound event. The method includes storing, in a memory, audio data acquired from an auditory environment via at least one microphone; receiving an input indicating a user request to identify a characteristic of a sound-producing object included in the auditory environment; determining, via a processor and based on a portion of the audio data acquired from the auditory environment prior to the user request, the characteristic of the sound-producing object; and causing information corresponding to the characteristic of the sound-producing object to be output via at least one output device.

At least one advantage of the disclosed embodiments is that at least one characteristic of a sound-producing object can be identified, even if that object is no longer present or producing sound in the vicinity of a user. A further advantage is that information relevant to or associated with the identified object can also be provided to the user, such as directionality of the sound-producing object, what event likely occurred to cause the sound-producing object to produce the sound heard by the user, and the like.

BRIEF DESCRIPTION OF THE SEVERAL VIEWS OF THE DRAWINGS

So that the manner in which the above recited features of the various embodiments can be understood in detail, a more particular description of the various embodiments, briefly summarized above, may be had by reference to embodiments, some of which are illustrated in the appended drawings. It is to be noted, however, that the appended drawings illustrate only typical embodiments and are therefore not to be considered limiting of its scope, for the various embodiments may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
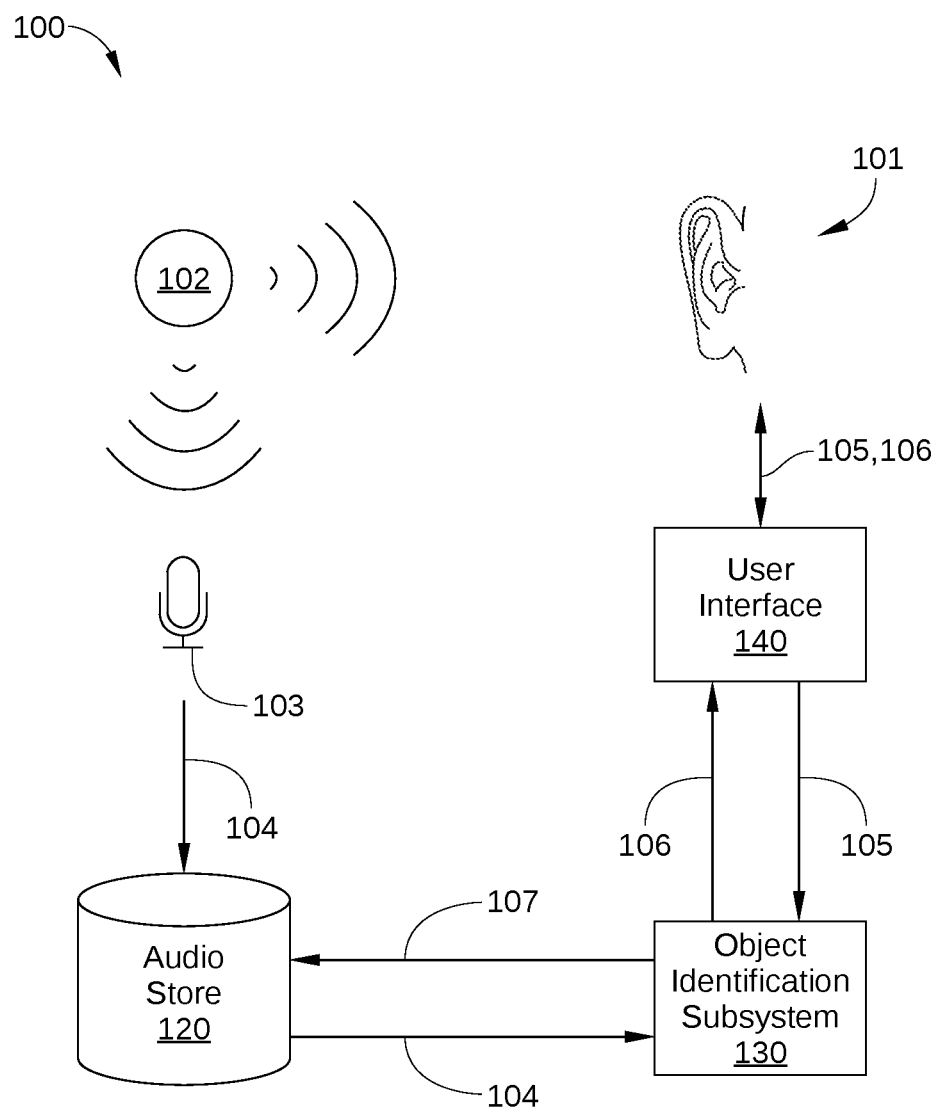
FIG. 1 is a schematic diagram illustrating a sound identification system, configured to implement at least one aspect of the various embodiments.

FIG. 1 is a schematic diagram illustrating a sound identification system 100, configured to implement at least one aspect of the various embodiments of the present disclosure. Sound identification system 100 retroactively augments human perception in the auditory domain. Specifically, in response to a query 105 from a user 101, sound identification system 100 is configured to identify a sound-producing object 102 that is associated with a sound event audible to user 101. A sound event includes, without limitation, the generation of at least one related sound that is audible to user 102 and occur either simultaneously or within a few seconds of each other. Sound identification system 100 can identify sound-producing object 102 and notify the user of the identity of sound-producing object 102, even if sound-producing object 102 is no longer present or producing sound audible to user 101. In some embodiments, sound identification system 100 can also provide information relevant to or associated with sound-producing object 102, such as directionality of the sound-producing object with respect to user 101, what event or sequence of events likely occurred to cause sound-producing object 102 to generate the sound event, larger context for the sound event (based on multiple sound-producing object identifications), and the like.

Sound identification system 100 includes, without limitation, at least one microphone 103, an audio store 120, an object identification subsystem 130, and a user interface 140. In some embodiments, microphone 103, audio store 120, object identification subsystem 130, and/or user interface 140 are integrated into a single device, such as a headphone- or earbud-based assembly (not shown). Alternatively, in some embodiments, at least one of microphone 103, audio store 120, and user interface 140 are incorporated into a headphone-based assembly, while the functionality of object identification subsystem 130 is implemented in a smartphone (not shown) that is wirelessly connected to the headphone-based assembly. In either case, computation-intensive functions and/or storage-intensive functions of object identification subsystem 130 can be implemented remotely, for example in at least one cloud-based system, as described in greater detail below.

Microphone 103 can be any technically feasible transducer-based or other sound-capturing device that receives sound inputs and generates audio data 104. In some embodiments, at least one of microphones 103 is incorporated in a wearable device worn by user 101 or other mobile computing device associated with user 101, such as a headphone-based assembly. Alternatively, in some embodiments, at least one of microphones 103 is external to devices associated with user 101 but are in the vicinity of user 101 and can detect sounds audible to user 101. For example, in such embodiments, at least one of microphone 103 is included in a nearby surveillance device, a smart speaker, an Internet of Things (IoT) device in the same room as the user, etc. In such embodiments, at least a portion of audio data 104 is typically stored in an audio store 120 that is remote from user 102.

Audio store 120 stores audio data 104 received from microphone(s) 103, and therefore includes a recording of sound events that have occurred that are audible to user 101. Generally, audio store 120 includes a substantially continuous audio record of sound events audible to user 101 from some time in the past up to the time that user 101 queries sound identification system 100 for information regarding a specific sound event. Audio store 120 can be implemented in various embodiments.

In embodiments in which data storage resources are limited, audio store 120 can include a circular buffer that maintains a number of the most recent samples of audio data 104, thereby recording audio data 104 corresponding to a relevant time period for analysis in response to a user query. Generally, the relevant time period includes a time period that begins a few seconds to minutes before user 101 queries sound identification system 100 and ends when user 101 queries sound identification system 100. Thus, audio store 120 includes audio data 104 for a certain length of time in the past immediately prior to a time at which user 101 queries sound identification system 100. When user 101 queries sound identification system 100, audio data 104 stored in such a circular buffer is copied into a memory accessible to object identification subsystem 130 and/or routed to object identification subsystem 130. Alternatively, the above-described circular buffer can be implemented in a computing device that is remote from user 101, such as a cloud-based computing device.

Alternatively or additionally, in some embodiments, some or all of audio store 120 is included in at least one system external to sound identification system 100 but still accessible to object identification subsystem 130. In such embodiments, audio data 104 includes data that are not generated by a microphone 103 included in a wearable device worn by user 101 or mobile computing device associated with user 101. For example, in such embodiments, audio data 104 can be extracted from audio-video recordings made during a time interval of a predetermined duration prior to the time that user 101 queries sound identification system 100 for identification of sound-producing object 102. Examples of systems external to sound identification system 100 but still accessible to object identification subsystem 130 include, without limitation, a surveillance system, such as a system associated with the home or employer of user 101, IoT devices proximate user 101, smart speakers, smart television sets, smart appliances, intelligent personal assistant (IPA) devices, and the like.

Alternatively or additionally, in some embodiments, audio store 120 includes multiple circular buffers for storing audio data 104, each buffer including audio data 104 for a different time interval in a series of sequential time intervals. In such embodiments, when object identification subsystem 130 fails to generate an identity of sound-producing object 102 with a confidence measure that exceeds a threshold confidence value, object identification subsystem 130 can perform additional analysis employing additional audio data 104 from at least one of the multiple circular buffers that each corresponds to a time interval further in the past. Further failure to generate an identity of sound-producing object 102 with a confidence measure that exceeds the threshold confidence value can cause object identification subsystem 130 to access audio data 104 from even further in the past from another of the multiple circular buffers. Thus, in such embodiments, audio store 120 progressively sends blocks of audio data 104 of increasing length to object identification subsystem 130, until some confidence criterion is met. The blocks of audio data 104 include concatenated data from multiple buffers, which are freed of the audio data stored 104 therein after object identification subsystem 130 has generated an identity of sound-producing object 102 with a sufficiently high confidence.

It is noted that in neural networks and other neural prediction systems and pattern recognition systems, confidence measures are commonly employed to evaluate reliability of prediction or recognition results. In embodiments described herein, a confidence measure associated with a particular identity of sound-producing object 102 generated by object identification subsystem 130 can quantify how closely an audio signature included in audio data 104 matches the audio signature of generated identity. Alternatively or additionally, in some embodiments a confidence measure associated with a particular identity of sound-producing object 102 can quantify a likelihood that that particular identity matches the actual identity of sound-producing object 102. Furthermore, the confidence measure associated with a particular identity of sound-producing object 102 generated by object identification subsystem 130 can include any other suitable value quantifying an estimated quality of the output of object identification sub system 130.

User interface 140 is configured to receive a query 105 from user 101 and deliver search results 106 generated by object identification subsystem 130 to user 101. User interface 140 can include any suitable hardware devices and associated software to provide search results 106 in an understandable form to user 101, such as loudspeakers incorporated in a headphone-based assembly or smartphone, a display screen incorporated in a wearable computing device or smartphone, a smart television set, a smart appliance (e.g., refrigerator), etc. When delivering search results 106 to user 101, user interface 140 translates search results 106 into a form that can be understood by user 101. Thus, user interface 140 can be configured to operate in multiple communication modalities, including, without limitation, a voice-based system, a visual notification system, and/or a text-based system. A voice-based system may include, without limitation, an intelligent personal assistant (IPA), voice agent, or other dialogue system incorporated into a wearable computing device (not shown) worn by user 101 or other mobile computing device (not shown) associated with user 101. A visual notification system may include, without limitation, a graphical user interface (GUI) of the wearable computing device or mobile computing device, such as a GUI displayed by a head-mounted display (HMD) or a display screen of a smartphone. A text-based system may operate in conjunction with the above-described display of the visual notification system to provide search results 106 in text form. Alternatively, a text-based system can be included in a separate text-capable device, such as a pager or other text-displaying device.

Search results 106 include, without limitation, at least one proposed identity for sound-producing object 102, as determined by object identification subsystem 130. In some embodiments, search results 106 can include additional information relevant to the at least one identity, such as a confidence measure associated with each identity, contextual information related to the identity, accompanying alerts, notifications, and/or additional words or text that cause the information included in search results 106 to be more noticeable, legible, or easier to understand. For instance, in an embodiment in which user interface 140 provides search results 106 via a voice-based system, object identification subsystem 130 can include in search results 106 additional terms or language to transform an object classification into a spoken phrase (e.g., "cat" becomes, "The sound you just heard was a cat.").

In some embodiments, user interface 140 is configured to deliver any other notifications or information to user 101 related to or derived from identification of sound-producing object 102. For example, in some embodiments, when object identification subsystem 130 fails to identify sound-producing object 102, or if the identification thereof fails to meet certain confidence criteria, user interface 140 may reflect this failure by providing additional information to the user (e.g., "I'm sorry, we could not identify what just made that sound").

Object identification subsystem 130 includes algorithms for generating at least one proposed identity for sound-producing object 102 in response to query 105 from user 101. Object identification subsystem 130 generates such identities based on audio data 104 stored in audio store 120. Thus, object identification subsystem 130 attempts to identify what sound-producing object 102 has produced at least a portion of the sounds included in audio data 104 that are stored in audio store 120.

Object identification subsystem 130 can include at least one machine learning method or algorithm for identifying sound-producing object 102 based on audio data 104. Suitable machine learning and/or neural network pattern recognition systems employed in object identification subsystem 130 include, without limitation, a nearest neighbor classifier procedure, Markov chains, deep learning methods, and/or any other technically feasible machine learning, statistical, or artificial intelligence-based approaches. For instance, in a nearest neighbor classifier procedure, features are extracted from an excerpt of audio data 104 and compared to features extracted from a plurality of reference audio samples of known origin. An accumulated distance between the features of the excerpt of audio data 104 and the features of reference audio samples is used to quantitatively determine better and worse matches for identification purposes. One example of a nearest neighbor classifier procedure for quantifying similarities between songs is described in "A Multiple Feature Model for Musical Similarity Retrieval," Allamanche, et al., ISMIR 2003 Conference Proceedings. Hidden Markov Models (HMIMs) have been suggested as an effective technique to represent individual musical pieces in a large collection of musical pieces. Using HMMs, a query to find a specific musical piece from such a large collection is reduced to finding the HMM that most closely matches the HMM of a sound sample included in the query. One example of an HMM-based procedure for simplifying searching for a particular song is described in "Indexing Hidden Markov Models for Music Retrieval," Jin, et al., ISMIR 2002 Conference Proceedings. Iterative deepening has been shown to achieve robust retrieval performance in searching for specific melodies without the accompanying computational burden. One example of an iterative deepening technique for simplifying searching for a particular melody is described in "Iterative Deepening for Melody Alignment and Retrieval", Adams, et al., ISMIR 2005 Conference Proceedings. The above-described approaches can also be employed for sound identification that is not music-related.

In some embodiments, object identification subsystem 130 is further configured to include a confidence measure or other accuracy metric for each possible identity for sound-producing object 102 that is generated. In such embodiments, the confidence measure quantifies a quality of the identity or likelihood that the possible identity is correct, as described above.

In some embodiments, object identification subsystem 130 is configured to include in search results 106 additional information related to sound-producing object 102, where the additional information can be in addition to or in lieu of a definition or possible identity of sound-producing object 102. For example, in such embodiments, object identification subsystem 130 can include attributes or other information associated with the identity of sound-producing object 102, such as links, recommendations, locations where sound-producing object 102 may be purchased (e.g., when object identification subsystem 130 identifies a particular song), or any other kind of information. For example, in such embodiments, the additional information may include, without limitation, directionality with respect to user 101 of sound-producing object 102, distance of sound-producing object 102 from user 101, and/or other details associated with sound-producing object 102 (e.g., "What you hear is a 747 during take-off, located approximately two miles from here"). Such additional information can be retrieved by object identification subsystem 130 via a smartphone or other wireless computing device associated with user 101, an IPA incorporated in the smartphone or wireless computing device, or by accessing the Internet and performing the search directly.

In a similar vein, object identification subsystem 130 can, alternatively or additionally, determine and include in search results 106 a description of a sound environment and/or the audio context indicated by audio data 104. For instance, rather than including only a possible identification of sound-producing object 102 in search results 106, in such embodiments object identification subsystem 130 can determine the possible identities of multiple sound-producing objects 102 that contributed to sounds recorded in audio data 104, and include a suitable description of the audio environment produced by the combination of the sounds generated by the multiple sound-producing objects 102. Thus, rather than informing user 101 that sound-producing object 102 is a cat, object identification subsystem 130 can generate search results 106 that indicate a larger context from the identification of multiple sound-producing objects 102: "That is a cat in a crowd of people on a busy street."

In some embodiments, object identification subsystem 130 is configured to determine situations and/or events, and to include a description thereof in search results 106. The situations and/or events determined by object identification subsystem 130 are based on the identification of multiple sound-producing objects 102 and on likely interactions therebetween. Thus, in such embodiments, rather including a list in search results 106 of the possible identities of the multiple sound-producing objects 102, object identification subsystem 130 includes a description of an event or situation in search results 106. For example, in one instance, object identification subsystem 130 makes several independent object identifications based on audio data 104, such as "cat", "dog", "growl", "hiss", and then combines the fact that these identifications being together in the same audio data 104 constitutes a "fight". Consequently, in this instance, object identification subsystem 130 does not include the following information in search results 106: "It is a cat and a dog and a growl and a hiss." Instead, object identification subsystem 130 includes the following information in search results 106: "It is a dog and a cat fighting." In such embodiments, object identification subsystem 130 may employ a database that describes events, or events associated with at least one sound-producing object. For instance, such a database could include the audio of a crowd cheering at a sporting event, and such audio would be labeled "excited large crowd." In addition, object identification subsystem 130 can be configured, for example through specifically tailored neural networks, pattern recognition systems, and/or artificial intelligence algorithms, to determine a higher-level event or event description based on the combination of multiple identified sound-producing objects.

Furthermore, in some embodiments, additional information included in search results 106 can include a classification of audio data 104, such as when object identification subsystem 130 cannot determine a specific identity of sound-producing object 102. For example: "I'm not sure what song this is but it sounds like rock music". Thus, in such embodiments, depending on the confidence measure of possible identities determined by object identification subsystem 130, object identification subsystem 130 can provide the additional information instead of a low-confidence identity for sound-producing object 102.

Figure 2:
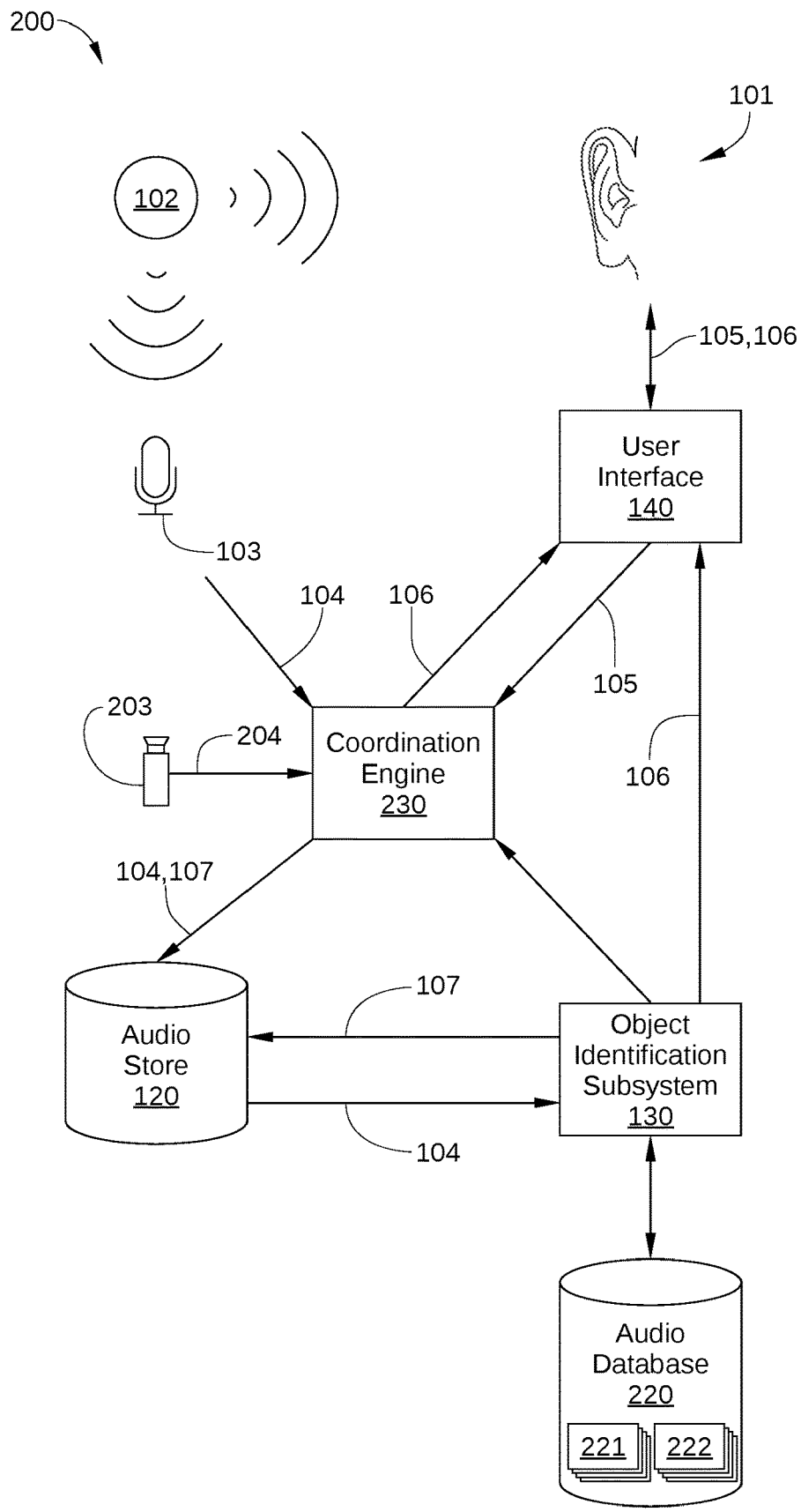
FIG. 2 a schematic diagram illustrating a sound identification system, configured to implement at least one aspect of the various embodiments.

In some embodiments, object identification subsystem 130 employs a database of previously classified audio tracks for the comparison and identification of a possible source of audio data 104. One such embodiment is illustrated in FIG. 2. FIG. 2 a schematic diagram illustrating a sound identification system 200, configured to implement at least one aspect of the various embodiments of the present disclosure. Sound identification system 200 is similar to sound identification system 100, but also includes a coordination engine 230 and an audio database 220 as shown. In some embodiments, sound identification system 200 also includes at least one additional sensor 203.

Coordination engine 230 is configured to manage the operation of sound identification system 200, including receipt of audio data 104 from microphone 103, direction of audio data 104 to audio store 120, initiation of object identification subsystem 130, and interactions with user interface 140. In some embodiments, coordination engine 230 is included in a wearable device, such as a headphone- or earbud-based assembly, along with microphone 103, audio store 120, and user interface 140. Alternatively, coordination engine 230 is implemented in a smartphone, electronic tablet, or other mobile computing device associated with user 101. In such embodiments, some or all of the functionality of object identification system 130 can be implemented in a computing device separate from the wearable device, such as a cloud-based or other distributed computing system. In addition, in such embodiments, audio database 220 resides in a computing device or distributed computing system separate from the wearable device.

Audio database 220 includes a plurality of audio tracks 221 to which audio data in audio store 120 can be compared. Each of audio tracks 221 is classified, tagged, or otherwise categorized according to what sound-producing object or combination of objects generated that particular audio track 221. In some embodiments, audio database 220 includes additional metadata 222 associated with each audio track 221, such as events associated with that particular audio track 221, interactions that can occur between the sound-producing object associated with that audio track 221 and other sound-producing objects, a sound power level or range typically associated with the sound-producing object that generated that audio track, etc.

Additional sensors 203 are configured to generate additional information 204 that can assist in the identification of sound-producing object 102 and/or in determining that such an identification should be made. For example, sound identification system 200 can identify a sound-producing object 102 based at least in part on other properties of objects in the environment of user 101, such as the visual or thermal properties of such objects, and/or the distance of such objects from user 101. Additional sensors 203 can include, without limitation, at least one camera, for capturing facial expressions of user 101 and/or for capturing images of the immediate environment of user 101. For example, in some embodiments, additional sensors 203 include at least one camera incorporated into a headphone-based assembly. In such embodiments, object identification system 130 can employ at least one image captured by one such camera oriented in the direction of a recently heard sound to assist in identification of sound-producing object 102. In such embodiments, an additional sensor data store similar to audio store 120 can be included in sound identification system 200. Alternatively or additionally, in some embodiments, additional sensors 203 include, without limitation, sensors configured to measure or monitor at least one physiological parameter of user 101, such as respiration rate, heart rate, cognitive workload of user 101, etc. Thus, in such embodiments, additional sensors 203 can detect certain physiological changes or other physiological events associated with or experienced by user 101, such as a sudden change in respiration rate or heart rate, an increased cognitive workload on user 101, an expression of strong surprise on the face of user 101, etc. In response to the detection of such an event, coordination engine 230 can cause object identification subsystem 130 to determine an identity of sound-producing object(s) 102, and inform user 101 accordingly, for example by audibly informing user 101: "That loud noise that just startled you was just a broom that fell to the floor in the other room." Such a determination can be based on information from additional sensors 203 as well as from audio data generated by microphone 103.

In operation, sound identification system 200 is configured to retroactively determine an identity of sound-producing object 102 based on a recorded sound generated by sound-producing object 102. Typically, sound identification system 200 determines the identity in response to a user request. Sound identification system 200 determines at least one identity for sound-producing object 102 by comparing audio data 104, which is recorded at a time prior to the user request, to the categorized or classified audio tracks 221 in audio database 220. In some embodiments, sound identification system 200 determines which audio track(s) 221 most closely match audio data 104 using at least one neural network or pattern identification algorithm, or any other suitable artificial intelligence algorithm. One such embodiment is described below in conjunction with FIG. 3.

Figure 3:
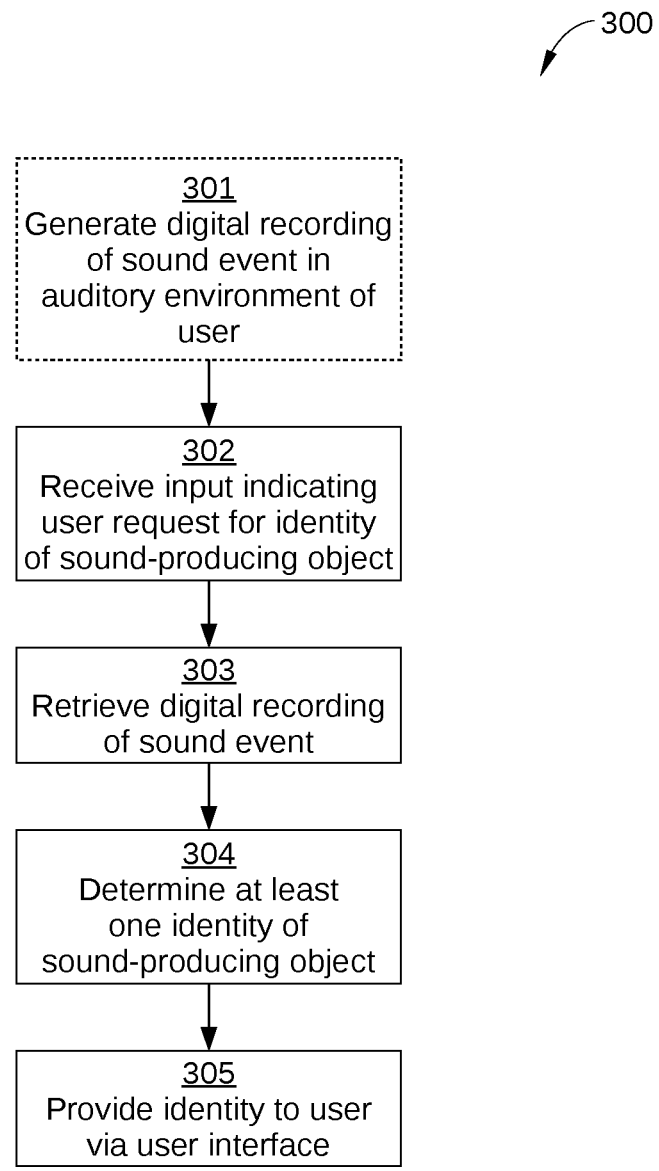
FIG. 3 sets forth a flowchart of method steps for identifying a sound-producing object, according to the various embodiments.

FIG. 3 sets forth a flowchart of method steps for identifying a sound-producing object, according to various embodiments of the present disclosure. Although the method steps are described with respect to the systems of FIGS. 1 and 2, persons skilled in the art will understand that any system configured to perform the method steps, in any order, falls within the scope of the various embodiments.

As shown, a method 300 begins at optional step 301, in which sound identification system 200 generates a digital recording of a sound event that has occurred in an auditory environment of user 101. The sound event can be any single sound or collection of multiple sounds audible to user 101, where the multiple sounds can occur sequentially or simultaneously, or may partially overlap in time with one another. Generally, a sound event spans a relatively short period of time, for example on the order of a fraction of a second to several seconds. Alternatively or additionally, in some embodiments a sound event can include, without limitation, at least one sound audible to the user that continue over a longer period, such as minutes. The auditory environment of user 101 generally includes any sounds that may be audible to user 101. It is noted that the auditory environment of user 101 is not limited to sounds generated by sound-producing objects that are proximate user 101. For instance, a sound that is included in the auditory environment of user 101 can be a very loud sound that is generated by a relatively distant sound-producing object, such as an airplane taking off or a firearm being fired. The digital recording generated in step 301 is stored by coordination engine 230 in audio store 120, which can include a circular buffer or other digital memory device.

In some embodiments, sound identification system 200 records and stores the digital recording generated in step 301 in a circular buffer of audio store 120. Thus, after a certain time interval, audio data 104 previously stored in audio store 120 are overwritten with newer audio data 104. That is, audio data acquired from the auditory environment that is older than a threshold duration of time is discarded from the memory that corresponds to the circular buffer. In such embodiments, the memory resources required for sound identification system 200 to implement embodiments of the disclosure are limited. Because sound events in the auditory environment of user 101 are generally no longer of interest after a certain relevance period, the storage of audio data 104 is generally of little value after such a relevance period. In some embodiments, the relevance period has a duration of an average spoken sentence, e.g., a few seconds up ten seconds. In some embodiments, the relevance period has a duration that extends up to a minute or more.

In some embodiments, in addition to and/or in lieu of sound identification system 200 generating the digital recording of the sound event in step 301, at least one computing device separate from sound identification system 200 also records some or all of the audio environment of user 101. For instance, audio from at least one computing device that is separate from sound identification system 200 but is still accessible to object identification subsystem 130 may record some or all of the audio environment of user 101 and store a digital recording thereof. Examples of such separate computing devices include, without limitation, surveillance cameras, gunshot-locating audio systems, automobile dashcams, smart speakers, smart television sets, smart appliances, IPA devices, and the like. In such embodiments, such additional sound recordings of the sound event in step 301 can be employed to facilitate the process of identifying at least one sound-producing object 102 associated with that sound event.

In step 302, sound identification system 200 receives an input, for example query 105, indicating a user request for the identity of a sound-producing object. In some embodiments, the input can include, without limitation, a physical input to a touch-based mechanism, such as a button being depressed by user 101, a switch being actuated, or a gesture being made on a touch-sensitive screen (e.g., a tap, a swipe, a double-tap, etc.). Alternatively, or additionally, in some embodiments the input can include, without limitation, a verbal input from a microphone, such as from microphone 103 or some other microphone associated with or included in sound identification system 200. In such embodiments, the input can be a keyword or key phrase spoken by user 101, such as "What was that?" Alternatively or additionally, any other verbal utterance or sound can be employed by user 101 as the verbal input. Alternatively or additionally, in some embodiments the input can include, without limitation, a user gesture, such as a facial gesture (e.g., a wink, a blink, etc.), a hand gesture, a head gesture (e.g., a nod or shake), and the like. Alternatively or additionally, in some embodiments the input can include, without limitation, additional information 204 from another additional sensor 203, such as a sudden change in expression of user 101, a change in the heart rate of user 101, etc.

Alternatively or additionally, in some embodiments the input can include, without limitation, the detection of a specified category of sound event. Thus, in such embodiments, sound identification system 200 can identify a sound-producing object 102 for user 101 without an explicit interaction from user 101. For example, the category of sound event can be specified by user 101 via a user-selected setting made prior to the occurrence of the sound event. In such embodiments, a user can select a mode or otherwise program sound identification system 200 so that, when a particular sound event that meets a certain criterion is recorded in step 301, in step 302 then sound identification system 200 interprets that sound event as the input indicating a user request for the identity of a sound-producing object. Thus, in response to a particular sound event meeting a certain criterion, sound identification system 200 subsequently determines an identity of at least one sound-producing object that generates a sound included in the particular sound event, as set forth below in conjunction with step 304. For example, such a criterion can include the determination that a particular sound event exceeds a specified sound power level, includes a sound generated in a specified direction relative to user 101, includes a keyword or key phrase that is uttered by someone other than user 101 (e.g., the user's name), and/or includes a specified category of sound. In such embodiments, under certain circumstances, sound identification system 200 can proactively identify at least one sound-producing object 102 without user 101 specifically asking "What was that?" For example, after a loud noise, sound identification system 200 which is installed in a vehicle, may say "In case you were wondering, the loud noise that you just heard was you driving over a piece of carpet that must have been dropped from a truck."

In step 303, sound identification system 200 retrieves a digital recording of the sound event that has previously occurred in the auditory environment of user 101. In some embodiments, coordination engine 230 retrieves the digital recording by transmitting a request 107 for at least a portion of audio data 104 stored in audio store 120, and in other embodiments, coordination engine 230 causes object identification subsystem 130 to retrieve the digital recording of the sound event, i.e., audio data 104, from audio store 120 by transmitting request 107. Typically, audio data 104 retrieved from audio store 120 includes a digital recording of the immediately preceding few seconds or minute of the audio environment of user 101. Alternatively or additionally, in some embodiments, coordination engine 230 causes object identification subsystem 130 to retrieve at least one digital recording of the sound event from at least one computing device separate from sound identification system 200. Such digital recordings of the sound event can be used in lieu of or addition to audio data 104 from audio store 120.

In step 304, based on the digital recording(s) of the sound event retrieved in step 303, object identification subsystem 130 determines at least one identity of sound-producing object 102. Alternatively or additionally, in some embodiments object identification subsystem 130 also determines a confidence measure for each identity determined for sound-producing object 102. Alternatively or additionally, in some embodiments object identification subsystem 130 also determines and/or searches for additional information related to the identity of sound-producing object 102 determined in step 304.

In some embodiments, object identification subsystem 130 determines at least one identity of sound-producing object 102 based on information from at least one additional sensor 203. For example, at least one image of the environment surrounding user 101 can be employed to assist in determining an identity of sound-producing object 203. In some embodiments, such images from one additional sensor 203 can be used in conjunction with additional information 204 from another additional sensor 203 that indicates the direction that user 101 is facing while requesting the identity of sound-producing object 102, such as a camera that enables determining gaze direction of user 101 and/or the current direction in which user 101 is gesturing.

In step 305, sound identification system 200 provides the at least one identity of sound-producing object 102 to user 101 via search results 106. In some embodiments, coordination engine 230 transmits search results 106 to user 101 via user interface 140, and in other embodiments, object identification subsystem 130 transmits search results 106 to user 101 via user interface 140. User interface 140 provides search results to user 101 via any suitable presentation mode. For example, a user-selected setting of sound identification system 200 may indicate that the preferred presentation mode for search results 106 is auditory, via loudspeakers of a head-mounted audio device in which sound identification system 200 is included. Alternatively or additionally, a user-selected setting of sound identification system 200 may indicate that the preferred presentation mode for search results 106 is visually, for example via a head-mounted display device, a public display device, a display device of a smart phone associated with user 101, or the like.

In some embodiments, sound identification system 200 is configured to include a playback of the sound in question prior to identifying sound-producing object 102. For example, in one such embodiment, if user 101 asks "What was that?", sound identification system 200 first responds "Did you mean this?" Sound identification system 200 then plays back the recently recorded sound of glass breaking and further states: "That was the bar tender who just dropped a glass."

Figure 4:
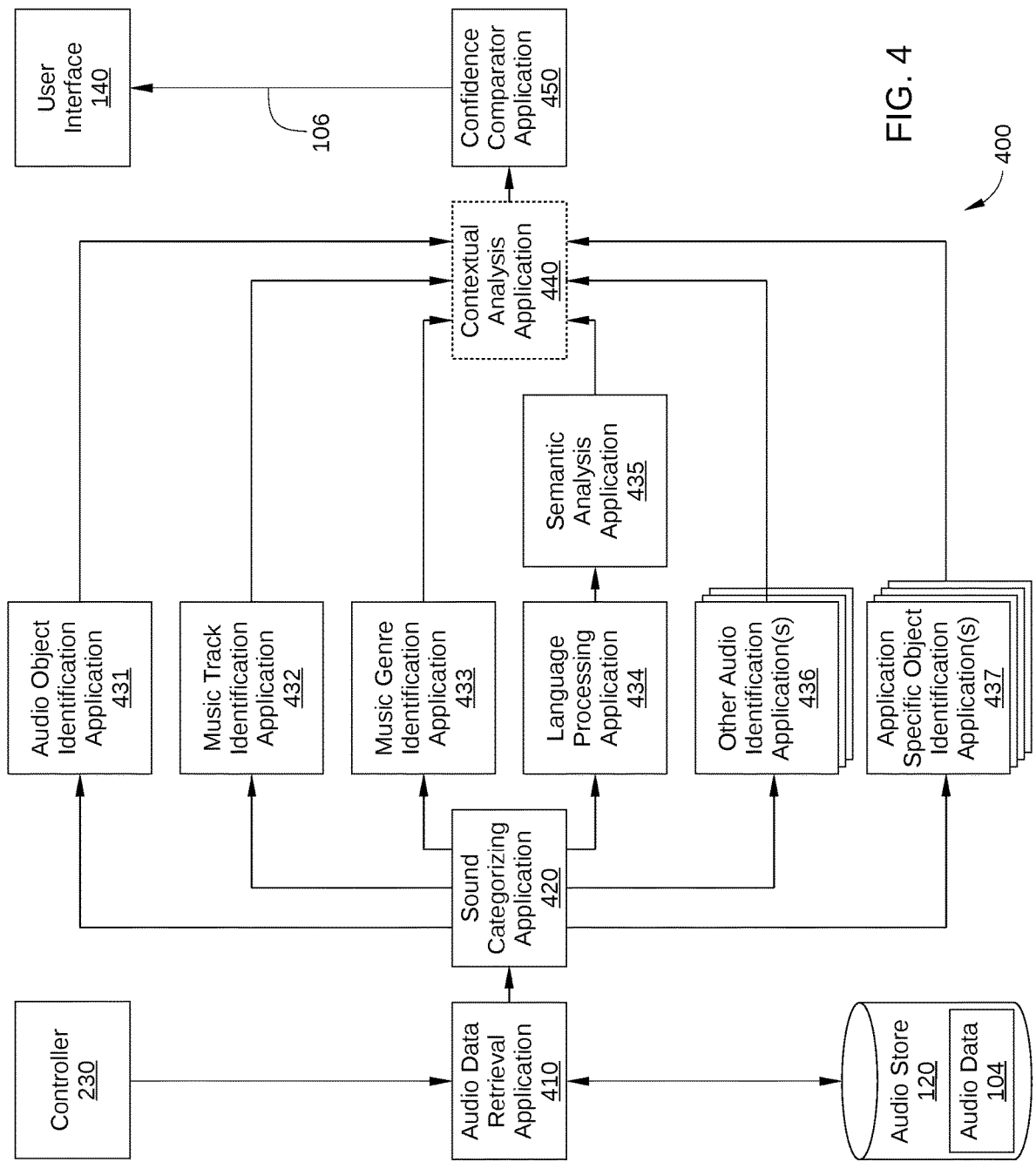
FIG. 4 is a block diagram schematically illustrating a multiple algorithm object identification subsystem, according to the various embodiments.

In some embodiments, object identification system 130 includes multiple algorithms, applications, or modules for determining an identity of sound-producing object 102. One such embodiment is illustrated in FIG. 4. FIG. 4 is a block diagram schematically illustrating a multiple algorithm object identification subsystem 400, according to various embodiments of the present disclosure. Multiple algorithm object identification subsystem 400 is configured to interact with coordination engine 230, audio store 120, and user interface 140 as described above for object identification subsystem 130 of FIGS. 1 and 2. In addition, multiple algorithm object identification subsystem 400 includes, without limitation, at least one of an audio data retrieval application 410, a sound categorizing application 420, various sound-identifying applications, and a confidence comparator application 450. In the embodiment illustrated in FIG. 4, the various sound-identifying applications include, without limitation, an audio object identification application 431, a music track identification application 432, a music genre identification application 433, a language processing application 434, a semantic analysis application 435, at least one other audio identification application 436, and/or at least one application specific object identification application 437. In embodiments in which multiple algorithm object identification subsystem 400 is configured to provide user 101 with additional contextual information related to an identity determined for sound-producing object 102, multiple algorithm object identification subsystem 400 further includes an optional contextual analysis application 440.

Audio data retrieval application 410 is configured to retrieve appropriate audio data 104 from audio store 120, for example in response to a command from coordination engine 230. In some embodiments, audio data retrieval application 410 retrieves all audio data 104 stored in audio store 120. In some embodiments, multiple algorithm object identification subsystem 400 is configured to use increasingly longer samples of audio data 104 until an identity of sound-producing object 102 is determined that satisfies a confidence criterion. In such embodiments, multiple algorithm object identification subsystem 400 is configured to retrieve an initial portion of audio data 104 from audio store 120, then subsequently retrieve additional portions of audio data 104 from audio store 120 when an identity of sound-producing object 102 is not determined that meets or exceeds a specified confidence threshold.

Sound categorizing application 420 is an initial sorting module or application included in multiple algorithm object identification subsystem 400. As such, multiple algorithm object identification subsystem 400 determines at least one category of sound-producing objects or sounds that have likely generated at least a portion of audio data 104. Thus, in general, sound categorizing application 420 determines whether audio data 104 retrieved from audio store 120 is subsequently processed by at least one of audio object identification application 431, music track identification application 432, music genre identification application 433, language processing application 434, audio identification application(s) 436, or application specific object identification application(s) 437. For example, in some embodiments, sound categorizing application 420 determines whether at least a portion of audio data 104 includes music or a particular song or genre of music, human language, and/or a sound that has been generated by a known audio object. In some embodiments, sound categorizing application 420 also determines whether at least a portion of audio data 104 has been generated by a known sound-producing object from a specific environment or situation, or whether a particular application specific object identification application(s) 437 has been selected by user 101 to be employed.

Audio object identification application 431 compares audio data 104 to sounds generated by known sound-producing objects to generate an identity for sound-producing object 102. Music track identification application 432 compares audio data 104 to known songs or other pieces of music to generate an identity for sound-producing object 102. Music genre identification application 433 determines whether audio data 104 includes music of a known genre, and language processing application 434 compares and matches audio data 104 to known languages. Semantic analysis application 435 performs semantic analysis of language snippets identified in audio data 104 by language processing application 434. Other audio identification application(s) 436 can include any other technically feasible categories of sound identification algorithms. Application specific object identification application(s) 437 can include sound identification algorithms that have been developed for a particular environment or situation that user 101 may be exposed to, such as at home, camping, driving, in an airport, in a factory, an urban environment, etc.

In some embodiments, each of the above-described sound-identifying applications is executed on a separate computing device or in multiple cloud-based computing devices. Alternatively or additionally, in some embodiments, at least one of the above-described sound-identifying applications is executed locally, such as by the same computing device associated with coordination engine 230. For example, in one such embodiment, user-specific sound-identifying applications, such as application specific object identification applications 437, may be loaded on a wearable computing device associated with user 101, while other more generic sound identification applications, such as language processing application 434, are implemented remotely.

In some embodiments, the above-described sound identifying applications also generate a confidence measure for each identity determined for sound-producing object 102. In such embodiments, confidence comparator application 450 is configured to determine which, if any, of the identities generated by the above-described sound identification applications meets or exceeds a specified confidence measure. Confidence comparator application 450 then includes, in search results 106, at least one of the identities of sound-producing object 102 that has the highest associated confidence measure.

In some embodiments, contextual analysis application 440 is configured to search for and/or otherwise generate contextual or other additional information related to each identity generated for the at least one sound-producing object 102 detected in a portion of audio data 104.

In some embodiments, multiple algorithm object identification subsystem 400 is configured to determine, based on an initial portion of audio data, an identity of sound-producing object 102 that has a confidence measure associated therewith. When the confidence measure associated with the identity fails to meet or exceed a specified confidence criteria, such as a specified threshold value, multiple algorithm object identification subsystem 400 retrieves a longer portion of audio data 104 and, based on analysis of the longer portion of audio data 104, again attempts to determine an identity of sound-producing object 102 with a confidence measure associated therewith that meets or exceeds the specified confidence criteria. One such embodiment is described below in conjunction with FIG. 5.

Figure 5:
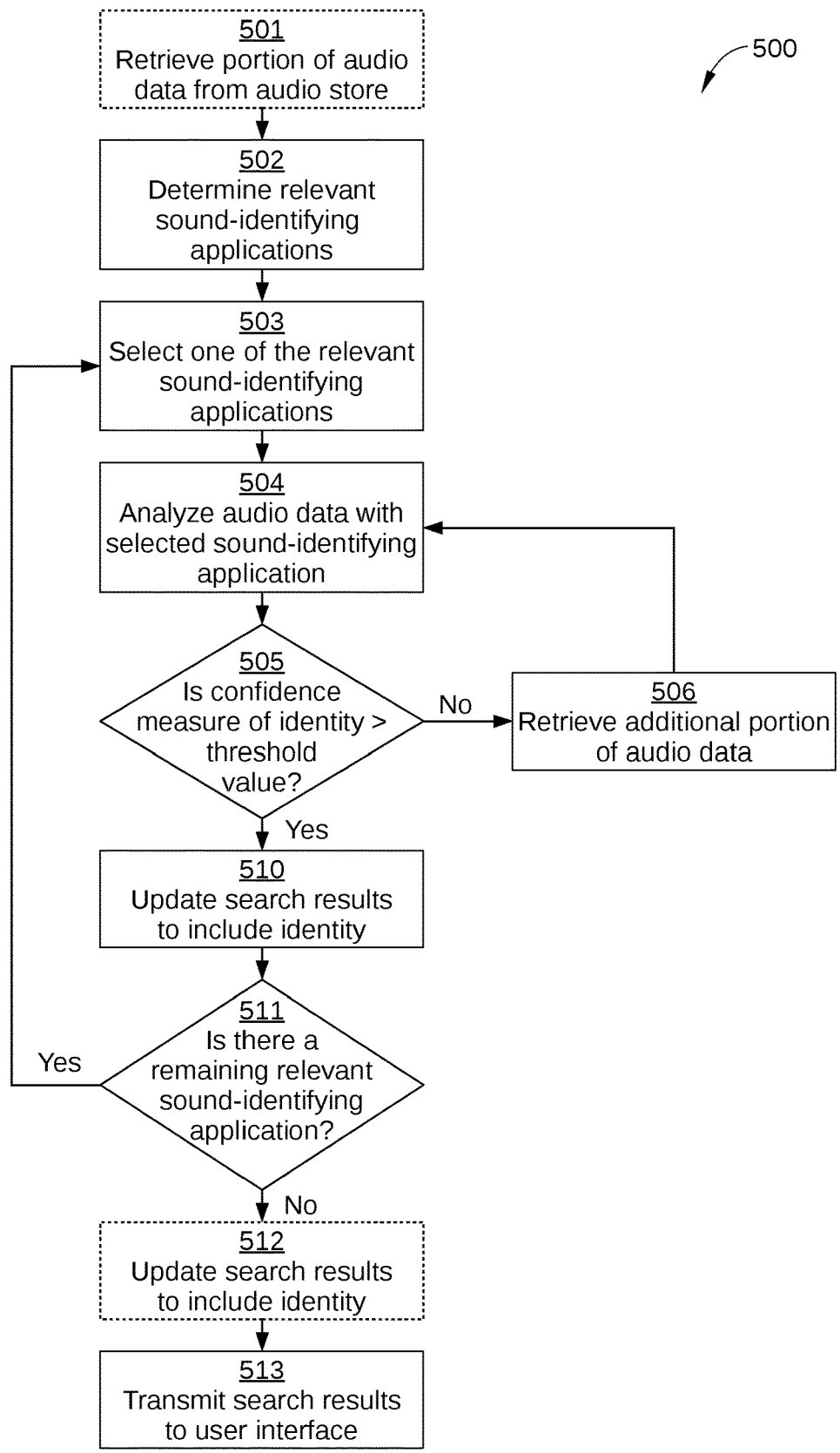
FIG. 5 sets forth a flowchart of method steps for identifying a sound-producing object with a high confidence, according to the various embodiments.

FIG. 5 sets forth a flowchart of method steps for identifying a sound-producing object with a high confidence, according to various embodiments of the present disclosure. Although the method steps are described with respect to the systems of FIGS. 1, 2, and 4, persons skilled in the art will understand that any system configured to perform the method steps, in any order, falls within the scope of the various embodiments.

As shown, a method 500 begins at optional step 501, in which audio data retrieval application 410 retrieves a portion of audio data 104 from audio store 120. For example, in some embodiments, audio data retrieval application 410 retrieves the portion of audio data 104 in response to a command from coordination engine 230. In step 501, the portion of audio data 104 retrieved from audio store 120 corresponds to the most recently recorded audio data 104.

In step 502, sound categorizing application 420 analyzes the portion of audio data 104, and determines which sound-identifying applications are likely to be relevant in identifying at least one sound-producing object 102 in audio data 104. Thus, in step 502, sound categorizing application 420 determines whether audio data 104 should be processed by at least one of audio object identification application 431, music track identification application 432, music genre identification application 433, language processing application 434, other audio identification application(s) 436, or application specific object identification application(s) 437.

In step 503, multiple algorithm object identification subsystem 400 selects one of the relevant sound-identifying applications determined in step 502.

In step 504, the relevant sound-identifying application selected in step 503 analyzes audio data 104 to determine at least one identity or other characteristic of sound-producing objects 102. In addition, for each identity or characteristic determined in step 504, the relevant sound-identifying application also generates a confidence measure, such as a value that indicates how closely audio data 104 matches a previously classified audio track 221, or an estimated percentage chance that the determined identity matches the actual identity of sound-producing object 102.

In step 505, confidence comparator application 450 determines whether the confidence measure of any identity or characteristic determined in step 504 exceeds a specified confidence threshold. If yes, method 500 proceeds to step 510; if no, method 500 proceeds to step 506.

In step 506, audio data retrieval application 410 retrieves an additional portion of audio data 104 from audio store 120. More specifically, in step 506, audio data retrieval application 410 retrieves an additional portion of audio data 104 that corresponds to an earlier time interval than the time interval associated with the first portion of audio data 104 retrieved in step 501. In some embodiments, the earlier time interval associated with the additional portion of audio data 104 is contiguous with the time interval associated with the first portion (and any other retrieved portions) of audio data 104. That is, in such embodiments, the additional portion of audio data 104 corresponds to the time interval immediately preceding the time interval corresponding to previously retrieved portions of audio data 104. Method 500 then returns to step 504 for analysis by the currently selected relevant sound-identifying application for further analysis of the now longer time interval of audio data 104. Alternatively, in some embodiments, method 500 returns to step 502, so that sound categorizing application 420 analyzes the now longer portion of audio data 104 to determine which sound-identifying applications are likely to be relevant in identifying at least one sound-producing object 102.

In step 510, which is performed in response to at least one identity or characteristic for sound-producing objects 102 having a sufficient confidence measure associated therewith, multiple algorithm object identification subsystem 400 updates search results 106 to include the at least one identity or characteristic having a sufficient confidence measure.

In step 511, multiple algorithm object identification subsystem 400 determines whether there is a remaining relevant sound-identifying application for performing analysis of audio data 104. If yes, method 500 returns to step 503, and another relevant sound-identifying application is selected; if no, method proceeds to optional step 512 or to step 513.

In optional step 512, contextual analysis application 440 determines and/or searches for additional contextual information associated with likely interactions and other associations between the at least one identity or characteristic included in search results 106. Additionally or alternatively, in some embodiments, contextual analysis application 440 also searches for or otherwise collects additional information related to at least one of the identities for sound-producing object(s) 102 included in search results 106. In such embodiments, contextual analysis application 440 includes the additional contextual information and the additional information related to at least one of the identities in search results 106.

In step 513, confidence comparator application 450 transmits search results 106 to user interface 140. Thus, confidence comparator application 450 causes information corresponding to the at least one identity or other characteristic of sound-producing object(s) 102 to be output via at least one output device.

In method 500, transmission and analysis is initially performed on a smaller portion of audio data 104, rather than all of audio data 104. If the determined identity or identities or characteristics have a relatively low confidence measure associated therewith, transmission and analysis of increasingly larger portions of audio data are performed. Thus, implementation of method 500 enables computational resources and wireless bandwidth to be used economically, since a smaller portion of audio data 104 is more easily transmitted and analyzed.

In the embodiment described above, each relevant sound-identifying application of multiple algorithm object identification subsystem 400 sequentially performs analysis on a portion of audio data 104. In other embodiments, two or more of the sound-identifying application of multiple algorithm object identification subsystem 400 can perform such analysis in parallel, particularly when some or all of multiple algorithm object identification subsystem 400 is implemented in a cloud-based or other distributed computing system.

The various embodiments of the disclosure can be implemented via a single computing device or multiple computing devices. For instance, the functionality of coordination engine 230, microphone 103, audio store 120, and user interface 140 may be implemented in a wearable device, smartphone, or other mobile computing device associated with user 101, while some or all of the functionality of object identification system 130 can be implemented in a cloud-based computing device or a computing device included in a distributed computing system. One embodiment of a computing device suitable for use as a mobile computing device and/or as a cloud-based computing device is described below in conjunction with FIG. 6.

Figure 6:
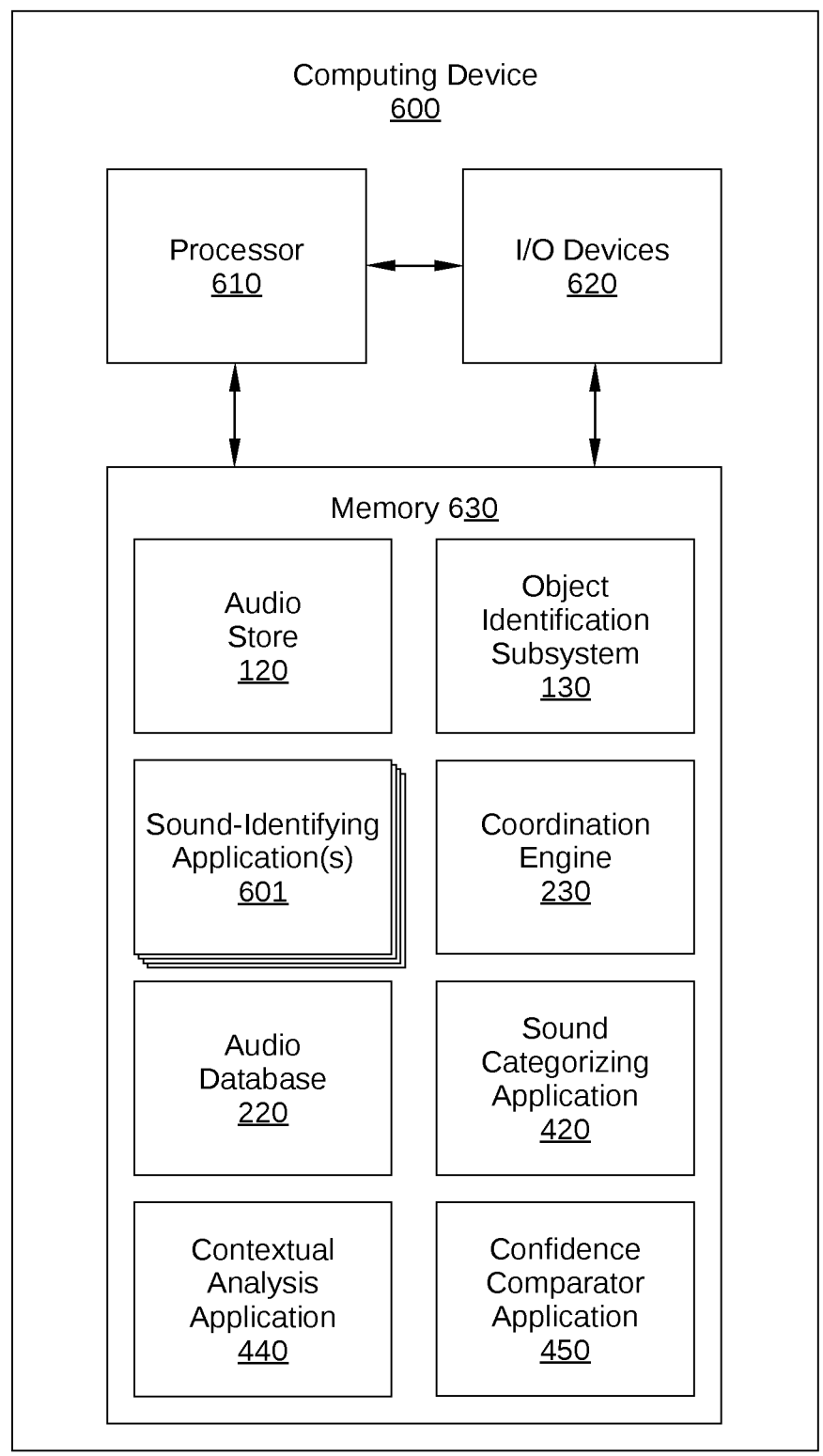
FIG. 6 is a more detailed illustration of a computing device, according to the various embodiments.

FIG. 6 is a more detailed illustration of a computing device 600, according to various embodiments. Computing device 600 is configured to implement at least one aspect of the present disclosure described herein. Computing device 600 may be any type of device capable of executing application programs including, without limitation, instructions associated with audio store 120, object identification subsystem 130, sound-identifying application(s) 601, coordination engine 230, audio database 220, sound categorizing application 420, contextual analysis application 440, and/or confidence comparator application 450. For example, and without limitation, computing device 600 may be an electronic tablet, a smartphone, a laptop computer, etc. Alternatively, computing device 600 may be implemented as a stand-alone chip, such as a microprocessor, or as part of a more comprehensive solution that is implemented as an application-specific integrated circuit (ASIC), a system-on-a-chip (SoC), and so forth. Generally, computing device 600 may be configured to coordinate the overall operation of a computer-based system, such as sound identification system 100 or sound identification system 200. In other embodiments, computing device 600 may be coupled to, but separate from such a computer-based system. In such embodiments, the computer-based system may include a separate processor that transmits data to computing device 600, such as audio data 104, and may be included in a consumer electronic device, such as a personal computer, smartphone, or headphone-based device. As shown, computing device 600 includes, without limitation, a processor 610, input/output (I/O) devices 620, and a memory 630.

Processor 610 may be implemented as a central processing unit (CPU), a graphics processing unit (GPU), an application-specific integrated circuit (ASIC), a field programmable gate array (FPGA), any other type of processing unit, or a combination of different processing units. In general, processor 610 may be any technically feasible hardware unit capable of processing data and/or executing software applications to facilitate operation of sound identification system 100 of FIG. 1 or sound identification system 200 of FIG. 2, as described herein. Among other things, and without limitation, processor 610 may be configured to execute instructions associated with audio store 120, object identification subsystem 130, sound-identifying applications 601, coordination engine 230, audio database 220, sound categorizing application 420, contextual analysis application 440, and/or confidence comparator application 450.

Memory 630 may include a random access memory (RAM) module, a flash memory unit, or any other type of memory unit or combination thereof, and may include a single memory module or a collection of memory modules. As shown, in some embodiments, some or all of audio store 120, object identification subsystem 130, sound-identifying applications 601, coordination engine 230, audio database 220, sound categorizing application 420, contextual analysis application 440, and/or confidence comparator application 450 may reside in memory 630 during operation.

I/O devices 620 includes at least one device capable of both receiving input, such as a keyboard, a mouse, a touch-sensitive screen, a microphone (such as microphone 103) and so forth, as well as devices capable of providing output, such as a display screen, loudspeakers (including a loudspeaker associated with a headphone-based system), and the like. The display screen may be incorporated in sound identification system 100 or may be external to sound identification system 100, such as a computer monitor, a video display screen, a display apparatus incorporated into a separate hand held device, or any other technically feasible display screen.

In sum, various embodiments set forth systems and techniques for retroactively identifying a sound-producing object. In response to an input indicating a user request for the identity of a sound-producing object, a previously recorded sound event is analyzed to determine an identity of the sound-producing object. For example, the previously recorded sound event is compared to categorized sounds from a sound database. The identity of the sound-producing object is then provided to the user.

At least one technological improvement of the disclosed embodiments is that the identity can be determined and/or at least one characteristic of a sound-producing object can be identified, even if that object is no longer present or producing sound in the vicinity of a user. Therefore, sound-producing objects that are associated with short-duration sound events can be identified in many contexts and situations, including zoological (e.g., animal identification), military (e.g., threat identification), technical (e.g., machine maintenance and/or trouble-shooting), medical (e.g., assistance for the hearing impaired), and the like.

1. In some embodiments, a method for identifying at least one characteristic of a sound-producing object comprises storing, in a memory, audio data acquired from an auditory environment via at least one microphone; receiving an input indicating a user request to identify a characteristic of a sound-producing object included in the auditory environment; determining, via a processor and based on a portion of the audio data acquired from the auditory environment prior to the user request, the characteristic of the sound-producing object; and causing information corresponding to the characteristic of the sound-producing object to be output via at least one output device.

2. The method of clause 1, further comprising discarding, from the memory, audio data acquired from the auditory environment that is older than a threshold duration of time.

3. The method of any of clauses 1-2, wherein the memory comprises a circular buffer.

4. The method of any of clauses 1-3, wherein storing, in the memory, audio data acquired from the auditory environment comprises storing a first portion of the audio data in a first portion of the circular buffer and a second portion of the audio data in a second portion of the circular buffer.

5. The method of any of clauses 1-4, wherein determining the characteristic of the sound-producing object comprises determining a first identity of the sound-producing object based on the first portion of the audio data.

6. The method of any of clauses 1-5, wherein determining the characteristic of the sound-producing object further comprises: determining that the first identity of the sound-producing object has a confidence measure associated therewith that is less than a threshold confidence value; and determining a second identity of the sound-producing object based on the first portion of the audio data and the second portion of the audio data.

7. The method of any of clauses 1-6, wherein the first portion of the audio data corresponds to a first time interval that occurs closer to receiving the input indicating the user request than a second time interval that corresponds to the second portion of the audio data.

8. The method of any of clauses 1-7, wherein the input indicating the user request comprises one of a physical input to a touch-based mechanism, a verbal input, a user gesture, and additional information from an additional sensor.

9. The method of any of clauses 1-8, wherein the verbal input includes a keyword or key phrase.

10. The method of any of clauses 1-9, further comprising retrieving the audio data from a computing device separate from a computing device that receives the input.

11. The method of any of clauses 1-10, further comprising retrieving the audio data from a memory included in a computing device that receives the input.

12. In some embodiments, a non-transitory computer-readable storage medium including instructions that, when executed by at least one processor, configure the at least one processor to retrieve information by performing the steps of: storing, in a rotating buffer, audio data acquired from an auditory environment via at least one microphone; receiving an input indicating a user request to identify a characteristic of a sound-producing object included in the auditory environment; determining, via a processor and based on a portion of the audio data acquired from the auditory environment prior to the user request, the characteristic of the sound-producing object; and causing information corresponding to the characteristic of the sound-producing object to be output via at least one output device.

13. The non-transitory computer-readable storage medium of clause 12, wherein the input indicating the user request comprises one of a physical input to a touch-based mechanism, a verbal input, a user gesture, and additional information from an additional sensor.

14. The non-transitory computer-readable storage medium of clauses 12 or 13, wherein the verbal input includes a keyword or key phrase.

15. The method of non-transitory computer-readable storage medium of any of clauses 12-14, further comprising instructions that, when executed by at least one processor, configure the at least one processor to perform the step of retrieving the audio data from a computing device separate from a computing device that receives the input.

16. The non-transitory computer-readable storage medium of any of clauses 12-15, further comprising retrieving the audio data from a memory included in a computing device that receives the input.

17. The non-transitory computer-readable storage medium of any of clauses 12-16, wherein storing, in the memory, audio data acquired from the auditory environment comprises storing a first portion of the audio data in a first portion of the circular buffer and a second portion of the audio data in a second portion of the circular buffer, and determining the characteristic of the sound-producing object comprises determining a first identity of the sound-producing object based on the first portion of the audio data.

18. In some embodiments, a system, comprises: a microphone; a memory; and a processor that is coupled to the microphone and the memory and is configured to: receive audio data of a sound event that has occurred in an auditory environment of the user from the microphone; store the audio data of the sound event in the memory; after receiving the audio data, receive an input indicating a user request for an identity of a sound-producing object; determining, based on a portion of the audio data, the identity of the sound-producing object; and causing information corresponding to the identity of the sound-producing object to be output via at least one output device.

19. The system of clause 18, wherein the memory comprises a rotating buffer.

20. The system of clauses 18 or 19, wherein the at least one output device comprises a loudspeaker included in a headphone-based assembly.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for identifying a sound-producing object, the method comprising:
    storing, in a memory, audio data acquired from an auditory environment via at least one microphone;
    receiving an input indicating a user request to identify the sound-producing object included in the auditory environment;
    generating, via a processor and based on a first portion of the audio data acquired from the auditory environment prior to the user request, a first determination that identifies the sound-producing object, wherein the first determination has a first confidence measure;
    causing, when the first confidence measure is greater than a confidence threshold, information corresponding to a characteristic of the sound-producing object to be output via at least one output device; and
    generating, via the processor when the first confidence measure is not greater than the confidence threshold, one or more additional determinations, based on additional portions of the audio data longer than the first portion, that identify the sound-producing object until a second determination has a second confidence measure that is greater than the confidence threshold.

2. The method of claim 1, further comprising discarding, from the memory, audio data acquired from the auditory environment that is older than a threshold duration of time.

3. The method of claim 2, wherein the memory comprises a circular buffer.

4. The method of claim 3, wherein storing, in the memory, audio data acquired from the auditory environment comprises storing the first portion of the audio data in a first portion of the circular buffer and a second portion of the audio data in a second portion of the circular buffer.

5. The method of claim 4, further comprising:
    determining that the first confidence measure is less than the confidence threshold; and generating, via the processor and based on both the first portion of the audio data and the second portion of the audio data, a second determination that identifies the sound-producing object, wherein the second determination has a second confidence measure; and causing, when the second confidence measure is greater than the confidence threshold, information corresponding to the characteristic of the sound-producing object to be output via the at least one output device.

6. The method of claim 5, wherein the first portion of the audio data corresponds to a first time interval that occurs closer to receiving the input indicating the user request than a second time interval that corresponds to the second portion of the audio data.

7. The method of claim 1, wherein the input indicating the user request comprises one of: a physical input to a touch-based mechanism, a verbal input, a user gesture, or additional information received from an additional sensor.

8. The method of claim 7, wherein the verbal input includes a keyword or key phrase.

9. The method of claim 1, further comprising retrieving the audio data from a computing device separate from a computing device that receives the input.

10. The method of claim 1, further comprising retrieving the audio data from a memory included in a computing device that receives the input.

11. One or more non-transitory computer-readable storage media including instructions that, when executed by one or more processors, cause the one or more processors to identify a sound-producing object by performing the steps of:
storing, in a rotating buffer, audio data acquired from an auditory environment via at least one microphone;
receiving an input indicating a user request to the sound-producing object included in the auditory environment;
generating, via the one or more processors and based on a first portion of the audio data acquired from the auditory environment prior to the user request, a first determination that identifies the sound-producing object, wherein the first determination has a first confidence measure;
causing, when the first confidence measure is greater than a confidence threshold, information corresponding to a characteristic of the sound-producing object to be output via at least one output device; and
generating, when the first confidence measure is not greater than the confidence threshold, one or more additional determinations, based on additional portions of the audio data longer than the first portion, that identify the sound-producing object until a second determination has a second confidence measure that is greater than the confidence threshold.

12. The one or more non-transitory computer-readable storage media of claim 11, wherein the input indicating the user request comprises one of: a physical input to a touch-based mechanism, a verbal input, a user gesture, or additional information received from an additional sensor.

13. The one or more non-transitory computer-readable storage media of claim 12, wherein the verbal input includes a keyword or key phrase.

14. The one or more non-transitory computer-readable storage media of claim 11, further comprising instructions that, when executed by the one or more processors, cause the one or more processors to perform the step of retrieving the audio data from a computing device separate from a computing device that receives the input.

15. The one or more non-transitory computer-readable storage media of claim 11, further comprising instructions that, when executed by the one or more processors, cause the one or more processors to perform the step of retrieving the audio data from a memory included in a computing device that receives the input.

16. The one or more non-transitory computer-readable storage media of claim 11, wherein:
storing the audio data comprises:
storing the first portion of the audio data in a first portion of the rotating buffer, and
storing a second portion of the audio data in a second portion of the rotating buffer, and
the first determination is based on the first portion of the audio data.

17. A system, comprising:
a microphone that acquires audio data in an auditory environment of a user;
a memory; and
a processor, coupled to the microphone and the memory, that:
receives, from the microphone, audio data of a sound event that has occurred in the auditory environment
stores, in the memory, the audio data of the sound event;
after receiving the audio data of the sound event, receives an input indicating a user request to identify a sound-producing object associated with the sound event;
generates, based on a first portion of the audio data of the sound event, a first determination that identifies the sound-producing object, wherein the first determination has a first confidence measure;
causes, when the first confidence measure is greater than a confidence threshold, information corresponding to an identity of the sound-producing object to be output via at least one output device; and
generates, when the first confidence measure is not greater than the confidence threshold, one or more additional determinations, based on additional portions of the audio data longer than the first portion, that identify the sound-producing object until a second determination has a second confidence measure that is greater than the confidence threshold.

18. The system of claim 17, wherein the memory comprises a rotating buffer.

19. The system of claim 17, wherein the at least one output device comprises a loudspeaker included in a headphone-based assembly.

* * * * *